Sept. 2, 1924.  1,506,879
H. B. BAGG
SCALE
Filed Aug. 7, 1918
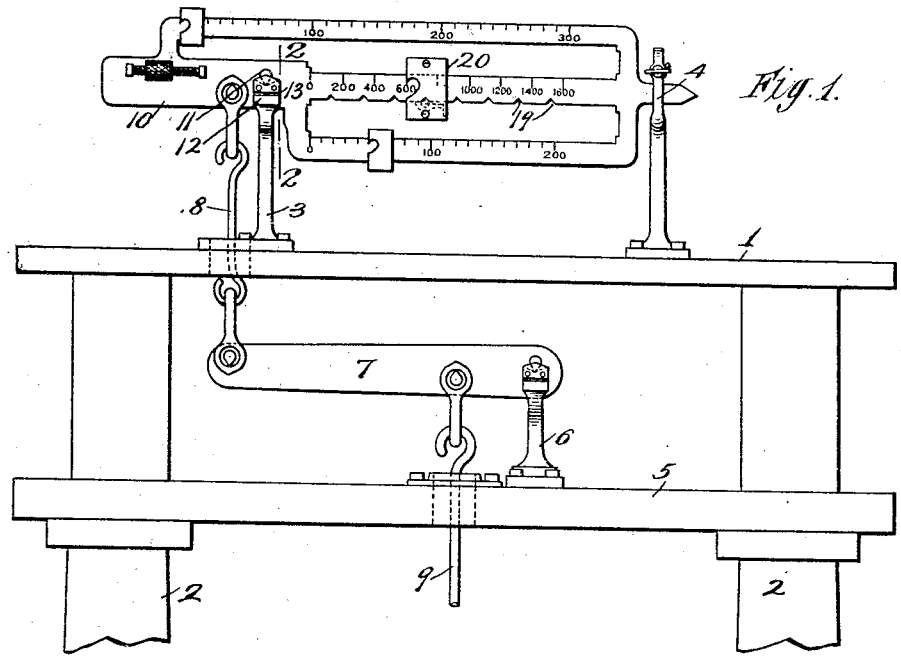
Fig. 1.
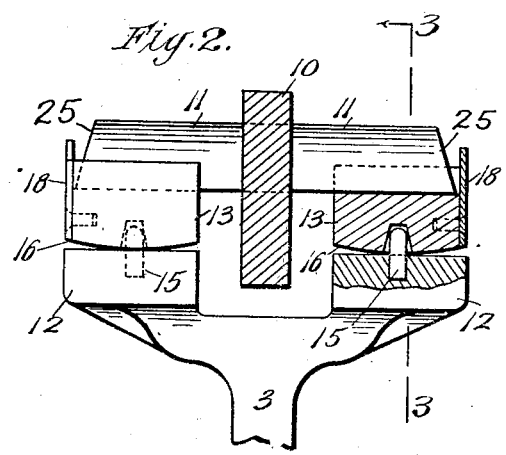
Fig. 2. Fig. 3.
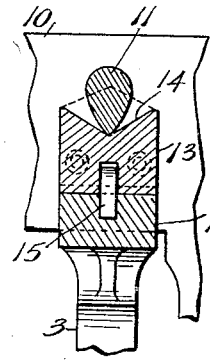
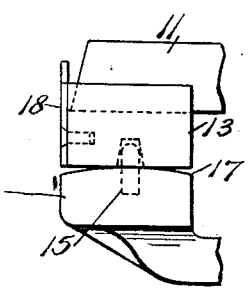
Fig. 7.
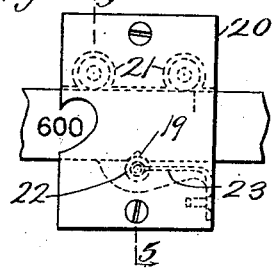
Fig. 4.
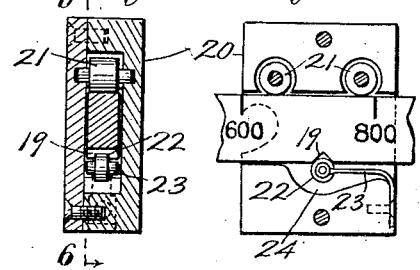
Fig. 5. Fig. 6.
Inventor:
Hollis B. Bagg
by his Attys:
Philipp, Sawyer
Rice & Kennedy Patented Sept. 2, 1924.

1,506,879

UNITED STATES PATENT OFFICE.

HOLLIS B. BAGG, OF WATERTOWN, CONNECTICUT, ASSIGNOR TO SCOVILL MANUFACTURING COMPANY, A CORPORATION OF CONNECTICUT.

SCALE.

Application filed August 7, 1918. Serial No. 248,679.

*To all whom it may concern:*

Be it known that I, HOLLIS B. BAGG, a citizen of the United States, residing at Watertown, county of Litchfield, and State of Connecticut, have invented certain new and useful Improvements in Scales, fully described and represented in the following specification and the accompanying drawings forming a part of the same.

This invention relates to certain improvements in scales.

In the type of scale in which the beam is supported on what is known as the pillar cap, that is, a cross-bar mounted either on one or two pillars, the shelf lever is ordinarily hung in a loop. In such scales, the beam may be supported either in a stand or in a loop. In either case, during the weighing operation, the shelf lever due to the method of supporting it, is liable to sway to such an extent that the connections from the shelf lever to the scale lever system or from the shelf lever to the beam are moved out of the vertical, and serious errors in weighing are liable to result.

Further, it has been usual to employ in connection with the beam and sliding poise a spring pressed detent to hold the poise in position. The beams have been notched either on their upper or lower sides, but in both cases, the detent commercially employed has consisted of a V-shaped block, the angularly disposed faces of the block when in locking position fitting the angularly disposed faces of the notches. Such detent construction for holding the poise is objectionable, because it requires a positive release which must be operated to permit the sliding movement of the poise, and is further objectionable because, if any dirt collects in a notch or notches, the detent will not truly engage the notches, with the result that the poise is not accurately positioned on the beam. While the actual variation of the poise from the true position may be slight, this may cause considerable error in determining the weight.

The present invention has for one of its objects to produce an improved construction of scale by which the connections between the shelf lever and beam and the shelf lever and the lever system of the scale are maintained vertical during weighing.

A further object of the invention is to produce an improved detent mechanism for the poise which will enable the poise to be always accurately set and easily released without the employment of special release mechanism.

With these and other objects not specifically referred to in view, the invention consists in certain constructions and in certain parts, improvements and combinations as will be hereinafter fully described and then specifically set forth.

In the accompanying drawings—

Figure 1 is a side elevation of so much of a scale embodying the invention as is necessary to an understanding thereof.

Figure 2 is a detail view, on a large scale, partly in section, illustrating the construction of an improved self-adjusting bearing which is employed in connection with the knife edge pivot.

Figure 3 is a section on the line 3—3 of Figure 2.

Figures 4, 5 and 6 are detail views illustrating the improved detent construction for holding the poise in position.

Figure 7 illustrates a modified construction of the self-adjusting bearing.

Referring to said drawings, 1 indicates the pillar cap, this cap, as illustrated, being supported on two pillars 2. In the construction shown, the beam is pivoted in a stand 3, the movements of the beam being controlled by the usual trig loop 4 mounted on a trig loop stand.

According to the present invention, the shelf lever instead of being mounted in a loop so that it may have a swinging movement which would tend to throw the connections with the beam and lever system out of line, is so mounted that, during weighing, the connections are maintained vertical. While this may be accomplished in various ways, in the particular construction illustrated, the pillars 2 carry a shelf 5 on which is supported a rigid shelf lever stand 6. The shelf lever 7 is pivoted to the stand and is connected to the beam by connections 8 of usual form, the connections from the shelf lever to the lever system of the scale being indicated at 9.

While the pivotal connections by which the beam is mounted in the beam stand 3 and the shelf lever is mounted in the shelf lever stand 6 may be varied, it is preferred to employ self-adjusting bearings for this purpose. To obtain the best results, self-adjusting bearings should be used both for pivotally mounting the shelf lever and for pivotally mounting the beam, but if it is desired to employ a self-adjusting bearing in only one of these places, it should be used for the pivotal connection between the beam and the beam stand. While the character of self-adjusting bearing may be varied, in the construction illustrated, the particular bearing employed is that illustrated in Figs. 2 and 3. In this construction, which illustrates the beam bearing, the rear end of the beam 10 is provided with a knife edge pivot 11 extending from both sides of the beam. The base for the bearing is formed by providing the beam stand with a fork the ends of the fork terminating in bases 12. As illustrated, the bearing support includes a pair of blocks 13 which rest on the bases 12 and are provided with recesses 14 in which the pivot 11 rests, the best results being attained when these recesses are V-shaped, as shown. This recessed support is so mounted with respect to the bases as to enable it to have rocking and swinging adjusting movements, the rocking movement compensating for irregularities or inaccuracies in the construction of the pivot and the swinging movement compensating for irregularities or inaccuracies in the construction of the support or pivot or both.

While the mounting of the support with respect to the base to attain the desired results may be varied, as illustrated, the blocks 13 are connected to the bases 12 by means of pivots 15, this construction allowing the swinging movement hereinbefore referred to.

In the particular construction illustrated, the rocking movement is had by rounding one of the meeting faces of the support or base. In the construction illustrated in Fig. 2, the under faces 16 of the blocks 13 are rounded, while in the construction shown in Fig. 7, the upper faces 17 of the bases 12 are rounded. The same result is obtained by either construction, but the construction illustrated in Fig. 2 is regarded as preferable from a manufacturing standpoint. It will be observed that the rounding is at the end portions only of the supporting blocks or bases, and that the meeting faces of the support and base are in contact between the rounded portions. This gives a firm seating of the support on the base and prevents any sidewise movement which would tend to increase the friction by throwing the pivot bar out of its true position.

It is also important in constructions of this character to prevent the sidewise shift of the pivot with respect to the bearing. In the construction shown, this is accomplished by closing the pivot recesses in the support by plates 18 which are mounted on the support itself and which move with the support. To prevent endwise shift of the pivot, it should be made long enough so that its ends will lie very close to the closing plates, and to reduce the friction to a minimum the ends of the pivot should be beveled back, as shown at 25.

The scale is provided with the usual sliding poise 20 and that part of the beam with which this poise co-operates is shown as notched on its under side, as at 19. While the improvements are not to be restricted to beams notched on the under side, this construction is regarded as preferable, because there is less tendency for the notches to accumulate dirt than when the beam is notched on the upper side.

The poise has the usual trolley rolls 21 and is provided with a detent mechanism for holding it in position. In constructions embodying the invention the detent mechanism employed will include a detent which has a curved surface, for engaging the sides of the notches, and in the best constructions, this curved surface will be, as shown, a roll 22. The roll, as shown, is mounted on a leaf spring 23 secured to the poise, the poise being chambered out, as indicated at 24, to give the detent room to work. A detent construction, such as described, has the advantage that no release mechanism is necessary, as the roll will readily disengage itself from a notch when the poise is pushed in either direction. Further, by employing a curved surface the engaging contact with the notch is limited to a small part of the sides, so that if dirt accumulates in the bottom of the notch, the poise will be accurately positioned notwithstanding this fact. Further, when a roll is employed, as in the construction illustrated, not only is wear on the detent avoided, because fresh engaging surfaces are being continually presented to the notch, but if there is dirt on the sides of the notch, the movement of the roll into and out of the notch tends to disengage it.

It will be understood that the invention is not to be confined to the particular constructions herein shown and described, but that changes and variations may be made therein without departing from the invention.

What is claimed is:—

In a scale, the combination with the beam notched on its under side, of a chambered poise slidable thereon, a plurality of trolley rolls mounted in the chamber of the poise to run on the top of the beam, and a spring roll located in the chamber of the poise for engaging the sides of the notches with which the poise cooperates to hold the poise in position.

In testimony whereof, I have hereunto set my hand.

HOLLIS B. BAGG.